(12) United States Patent
Mair

(10) Patent No.: US 7,252,173 B2
(45) Date of Patent: Aug. 7, 2007

(54) DIFFERENTIAL GEAR FOR A VEHICLE

(75) Inventor: Ulrich Mair, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 295 days.

(21) Appl. No.: 10/977,778

(22) Filed: Oct. 29, 2004

(65) Prior Publication Data

US 2005/0096174 A1  May 5, 2005

(30) Foreign Application Priority Data

Oct. 31, 2003  (DE)  ................... 103 50 870

(51) Int. Cl.
*B60K 17/16* (2006.01)
(52) U.S. Cl. .............. 180/361; 180/248; 180/359; 180/383
(58) Field of Classification Search ........... 180/233, 180/248, 252, 253, 356, 359, 360, 361, 363, 180/372, 374, 375, 377, 378, 383
See application file for complete search history.

(56) References Cited

U.S. PATENT DOCUMENTS

| 1,617,265 | A |   | 2/1927 | Melanowski |  |
|---|---|---|---|---|---|
| 4,313,518 | A | * | 2/1982 | Ledwinka et al. | .......... 180/233 |
| 4,582,160 | A | * | 4/1986 | Weismann et al. | .......... 180/250 |
| 4,733,744 | A | * | 3/1988 | Glaze | .......... 180/256 |
| 4,856,372 | A | * | 8/1989 | Williamson | .......... 475/242 |
| 4,907,672 | A | * | 3/1990 | Muzzarelli | .......... 180/233 |
| 5,041,068 | A |   | 8/1991 | Kobayashi |  |
| 5,950,750 | A | * | 9/1999 | Dong et al. | .......... 180/24.09 |
| 6,662,896 | B1 | * | 12/2003 | Karlsson | .......... 180/348 |
| 6,779,623 | B2 | * | 8/2004 | Woods et al. | .......... 180/361 |

FOREIGN PATENT DOCUMENTS

GB       2 365 085 A       2/2002

* cited by examiner

*Primary Examiner*—Paul N. Dickson
*Assistant Examiner*—Tiffany L. Webb
(74) *Attorney, Agent, or Firm*—Davis Bujold & Daniels, P.L.L.C.

(57) ABSTRACT

A differential (2) for a vehicle is proposed for the apportionment of a drive torque conducted via a drive shaft on a crown gear (7). The drive torque is engendered by a motor (1) onto two output shafts (3, 4) and differential is to serve for the compensation of a difference in speed of rotation between the two output shafts (3, 4). The crown gear (7) is located in an area between the motor (1) and a drive wheel (6) of a vehicle (29) while a semi-independent suspension assembly (10) is to be found between the output shafts (3, 4) in the area between the motor (1) and the other drive wheel (5) of the vehicle, whereby the crown gear (7) and the semi-independent suspension assembly (10) are bound together via a shaft (8).

19 Claims, 3 Drawing Sheets

DIFFERENTIAL GEAR FOR A VEHICLE

This application claims priority from German Application Serial No. 103 50 870.8 filed Oct. 31, 2003.

FIELD OF THE INVENTION

The invention concerns a differential for a vehicle.

BACKGROUND OF THE INVENTION

In practice, in a known way with regard to vehicles, a torque generated by a motor is necessarily conducted through a succession of gear trains to driven wheels. If vehicles, such as 4-wheel drive passenger cars or 4-wheel drive trucks are made with a plurality of driven axles, then the torque from the motor must be apportioned in a special gear assembly in the vehicles to the respective drive axles.

For this load apportionment, differential gear trains (hereinafter referred to as "differential(s)") are installed, whereby a center differential, when seen in the direction of travel, compensates for longitudinal axle spacing (front to back) in apportioning the torque for a plurality of driven vehicle axles. Transverse differentials, i.e., compensating gear trains, are used in regard to the relationship of the direction of travel (curving) of a vehicle to a transverse apportionment of the torque delivered to the driven wheels on a vehicle axle.

Differentials conventionally employed in practice are, among other types, bevel gear differentials, spur gear differentials in planet gear techniques or even worm gear differentials. Especially because of the possibility for nonsymmetrical torque distribution, spur gear differentials are mostly installed as central differentials. Bevel gear differentials present, generally, a standard for transverse compensation and worm gear differentials are installed both for length apportionment was well as for transverse load dividing.

The torque produced by the motor is, in the case of a bevel gear differential, introduced into the differential on a worm or hypoid toothed bevel gear, for example, and then transmitted by means of a differential cage onto free pinion gears, which act in the manner of a balance-beam and continually create torque compensation between two output shafts of the bevel gears of the bevel gear differential. In the case of straight line forward travel of a vehicle equipped with the bevel gear differential, then, the differential cage and the pinion, which are bound with rotational capability to the bevel gears, as well as the pinions within a differential cage, all run together as one unit whereby differential bolts and the thereon placed differential pinions contribute or receive no relative motion.

In curve travel operation, a requirement is that a bevel gear shaft, where the bevel gear is on a first output shaft of a differential and which is bound to that axle of a wheel of the vehicle, which is on the outside of the curve, must rotate at a higher speed than that axle shaft, i.e., a second output drive shaft of the differential, which is bound that axle of a wheel on the inner circumference of the curve, whereby the bevel gears and the differential pinions, in a known way and manner, so rotate in relation to one another, that a compensation of the different speeds of rotation is established between the two wheels of a vehicle.

A disadvantage of this arrangement is that the differentials known in conventional practice, which are normally transverse differentials between the motor and wheels, possess such an outer dimensioning that in the relevant installation position, the space available in the presence of a crown gear assembly is not sufficient to also accommodate a conventional differential. In such a case, it becomes necessary to place the differential on that side of the motor which is remote from the crown gear assembly. When this is done, then it becomes necessary that torque from a transmission with an output on the same side of the motor as the crown gear assembly, is conducted by means of an additional torque transfer device to that side of the motor which is remote from the steering gear assembly and to a crown gear of the differential.

Accordingly, the present invention has the purpose of making such a differential available, wherein the introduction of torque into a differential can be conducted on the same side of a motor on which the output of a transmission is located and wherein a crown gear assembly of a differential is also present.

SUMMARY OF THE INVENTION

In the case of the invented differential for a vehicle for the apportionment of motor generated torque, which has been introduced to a differential crown gear by one drive shaft and then split onto two output shafts for the stated compensation of a difference in the speed of rotation between the two output shafts, there exists a possibility that torque from a transmission output can be introduced by means of a more compact assembly onto the same side of the motor of an input gear train into that differential, upon which the transmission output of the transmission is expected.

This is enabled, in that the differential crown gear can be placed in an area between the motor and a drive gear of a vehicle axle and before an shaft coupling assembly, which assembly is between the output shafts of the differential and the other drive gear of the axle. Further, the crown gear and the shaft coupling assembly are are united by a shaft.

With this background, it is possible for the differential crown gear, which is inherently thin and consequently requires very small axial space, can be placed on that side of the motor which is remote from the differential, where both the transmission output and also access to a crown gear assembly of the differential are located.

Torque has been delivered from a transmission output. By means of a lateral shaft, which runs in the direction of the vehicle's longitudinal direction and sideways along the motor, the torque is conducted to the differential crown gear. This shaft runs transversely across the vehicle and advantageously finds itself in the area of a second shaft running likewise transversely between the shaft coupling assembly and the differential. Further, the drive gear provided for the front axle of the vehicle is mounted on that side of the motor which is remote from the differential. Comparing the above to the methods known in the practice, less construction space in the area of the motor of a vehicle is necessary.

BRIEF DESCRIPTION OF THE DRAWINGS

For the improvement of a general all-encompassing view in the description of the various embodiments for components of construction and function, the same reference numbers have been used. The invention will now be described, by way of example, with reference to the accompanying drawings in which.

DETAILED DESCRIPTION OF THE INVENTION

Figure 1:
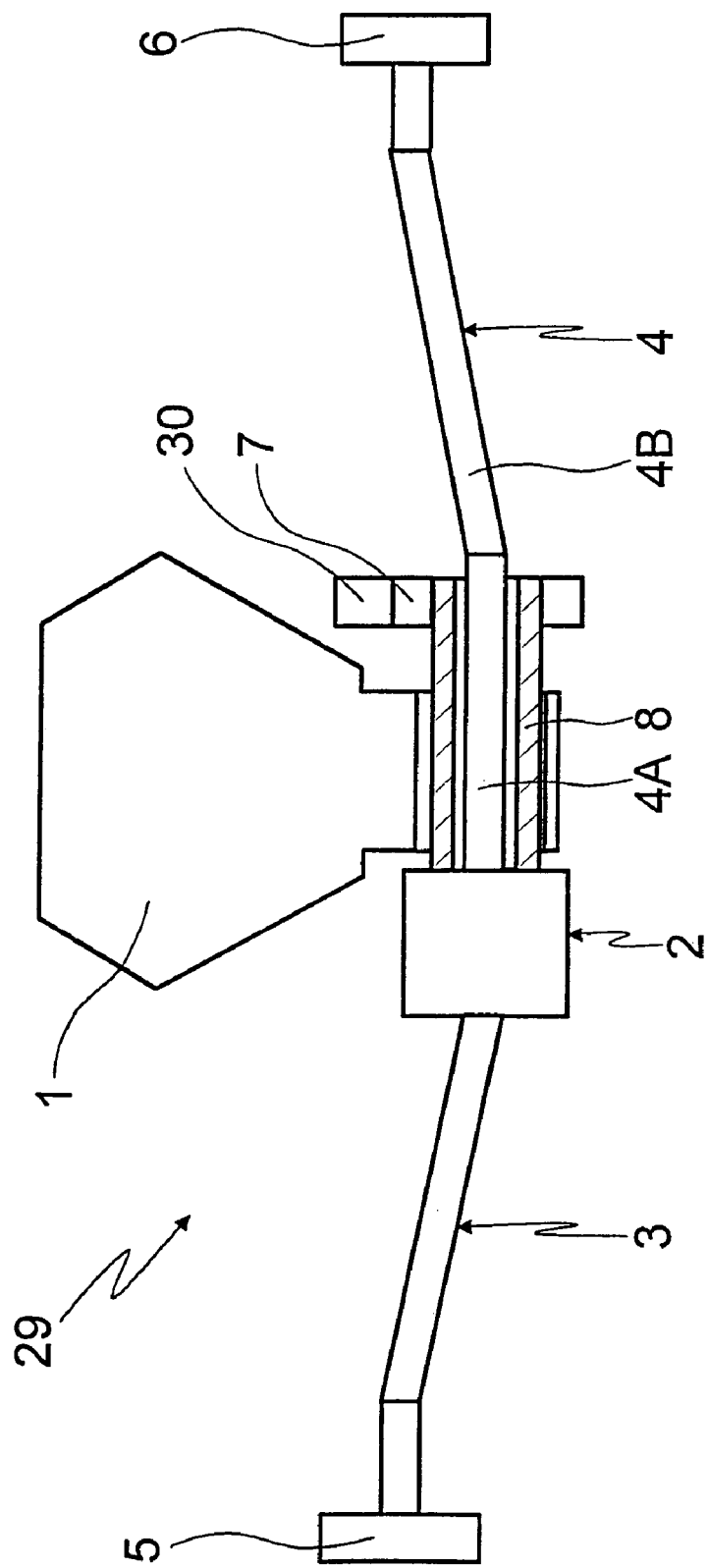
FIG. 1 is a front view of a motor with components of a vehicle front axle, wherein a torque is apportioned between two vehicle sides by means of the invented differential.

In FIG. 1, in a highly schematic presentation shows several components of a vehicle front axle 29 along with a motor 1. In the shown arrangement, the motor 1 generated torque is first conducted to a transmission (not shown), wherein any one of several speed ratios can be selected. The transmission can be of conventional construction. The torque, now communicates with a differential gear 2, which is present as a cross-apportioning gear train. Further, the value of the torque now exists as a result of the ratio selected by the transmission and is split in the differential gear 2 into two front wheel drive shafts 3 and 4. Therefrom it is respectively conducted to drive wheels 5 and 6 which are bound to a front axle 29.

The differential gear 2 serves two purposes. The first of these purposes is to fulfill the function of a transverse divider of the delivered torque into two branches transverse to the longitudinal axis of the vehicle, namely, between two front drive wheels on the now empowered right and left axles. The second purpose is to differentiate the effective wheel separating distance (wheel base) for the compensated splitting of the torque between the two axles. To accomplish these two goals, the differential can be based on bevel gears, spur gears or crown wheel gears.

Figure 3:
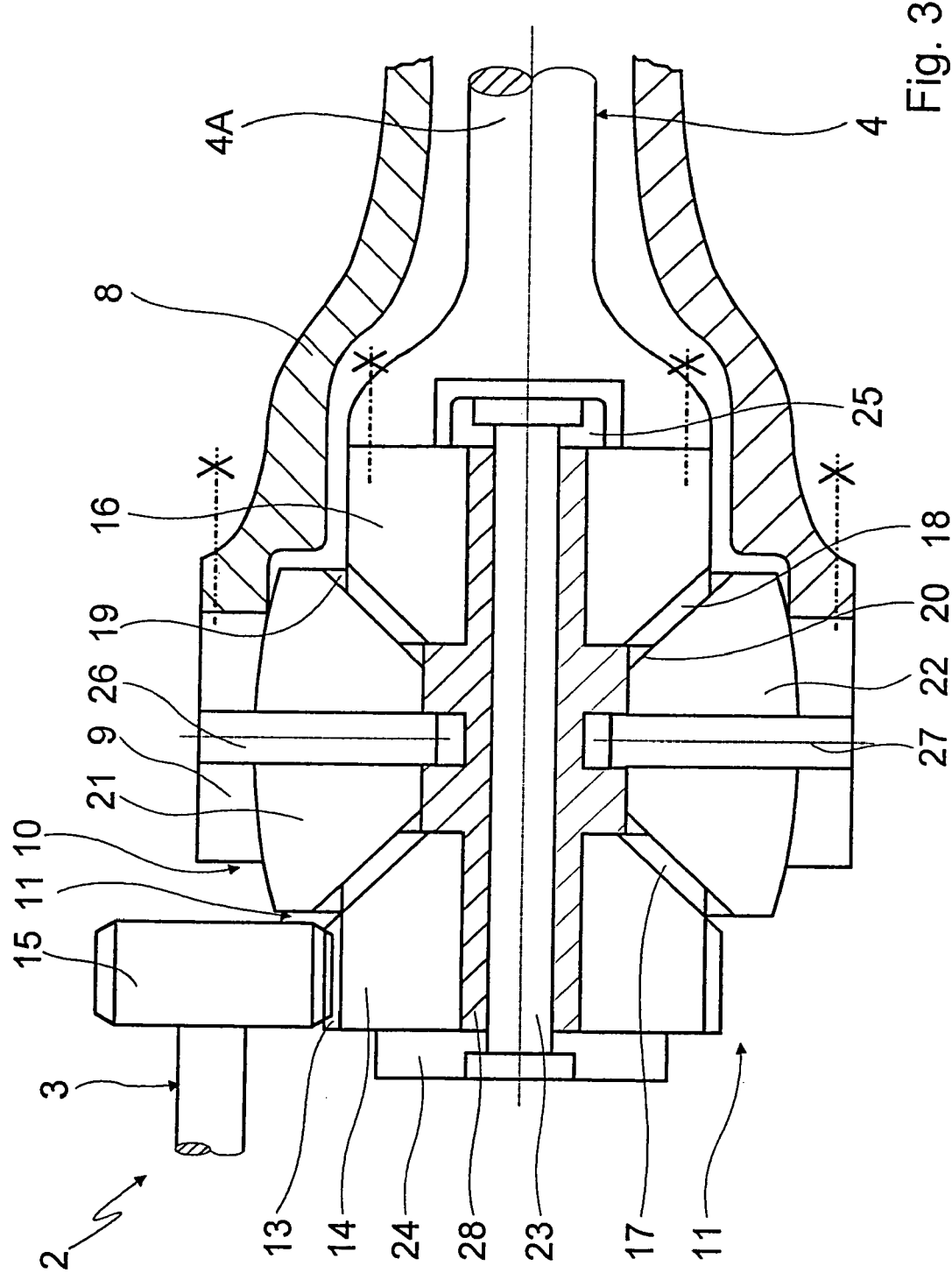
FIG. 3 is a schematic sectional presentation of an invented and completed differential shown free of other components.

The introduction of the transmission output torque of the transmission into the differential 2 is carried out by means of a bevel gear 30, which meshes with a crown gear 7 of the differential 2. The bevel gear 30 rotates in common with a side located shaft (not further defined), which is connected with the output gearing of the transmission. The crown gear is present between the motor 1 and the respective drive wheel 6. FIG. 3 illustrates a more detailed differential cage 9, as well as a shaft coupling assembly 10. This differential cage 9 is placed between the two front drive wheels 5, 6 of the front axle 29. In order that the torque, delivered by the transmission, can be conducted from the crown gear 7 to the two output shafts 3, 4 (notably the axle connections), and the crown gear 7 are connected to the differential cage 9 of the differential 2. This connection is made by an hollow shaft 8, which is shown in cross-hatched section in FIG. 3 and is of a conventional design. The differential cage 9 circumferentially encapsulates the shaft coupling assembly 10, which is between the two drive shafts 3, 4.

The torque output drive shaft 4 runs as initiated by the shaft coupling assembly 10 by means of the hollow shaft 8 in the direction of the drive wheel 6. Conversely, the output drive shaft 3, in accordance with the shaft coupling assembly 10, leads directly to the drive wheel 5, the wheel 5 being proximal to the differential 2. The two output shafts 3, 4 exist as jointed shafts, in order to cope with and compensate for the varying elevations experienced separately by the two wheels 5, 6 while in operation.

The output shaft 4 is a combination of a transverse shaft 4A penetrating through the internal gear 8 and the therewith connected jointed shaft 4B. Accordingly, dependent upon the respective actual application case, the hollow shaft 8 and the transverse shaft 4A assembly can be conducted, as seen in FIG. 1, directly through the housing of the motor 1 which would be through the oil pan of the motor. Another embodiment would place the gear and shaft, as seen in the direction of travel, in front of the motor 1. Alternately also, the gear and shaft can be positioned underneath the motor 1 in the direction of the drive wheel 6, which is on the other side of the motor 1 than is the shaft coupling assembly 10.

Thus, the above positions, advantageously provide the possibility that the torque transfer from the output of the transmission, which outlet is placed at the side of the motor 1, also in FIG. 1, where likewise the crown gear assembly (not shown) of the vehicle is located, can be carried out in a space saving manner. The reason for this is, that principally, the crown gear 7, which makes little claim to space in the axial direction of the front axle 29, is placed on this side of the motor 1 and the torque from the transmission is successively conducted from the crown gear 7, through the hollow shaft 8 in the direction of the shaft coupling assembly 10 of the differential 2 and does this with little requirement for useable space and in an advantageous way.

That part of the differential 2, in which the shaft coupling assembly 10 is positioned between the two drive shafts 3 and 4 as well as the crown gear 7, is rotatably fastened to the motor 1. On this account, alternately, the crown gear 7 and the therewith connected hollow shaft 8 can be also placed on the steering mechanism of the of the vehicle thereby the steering mechanism becomes included in the power path.

Figure 2:
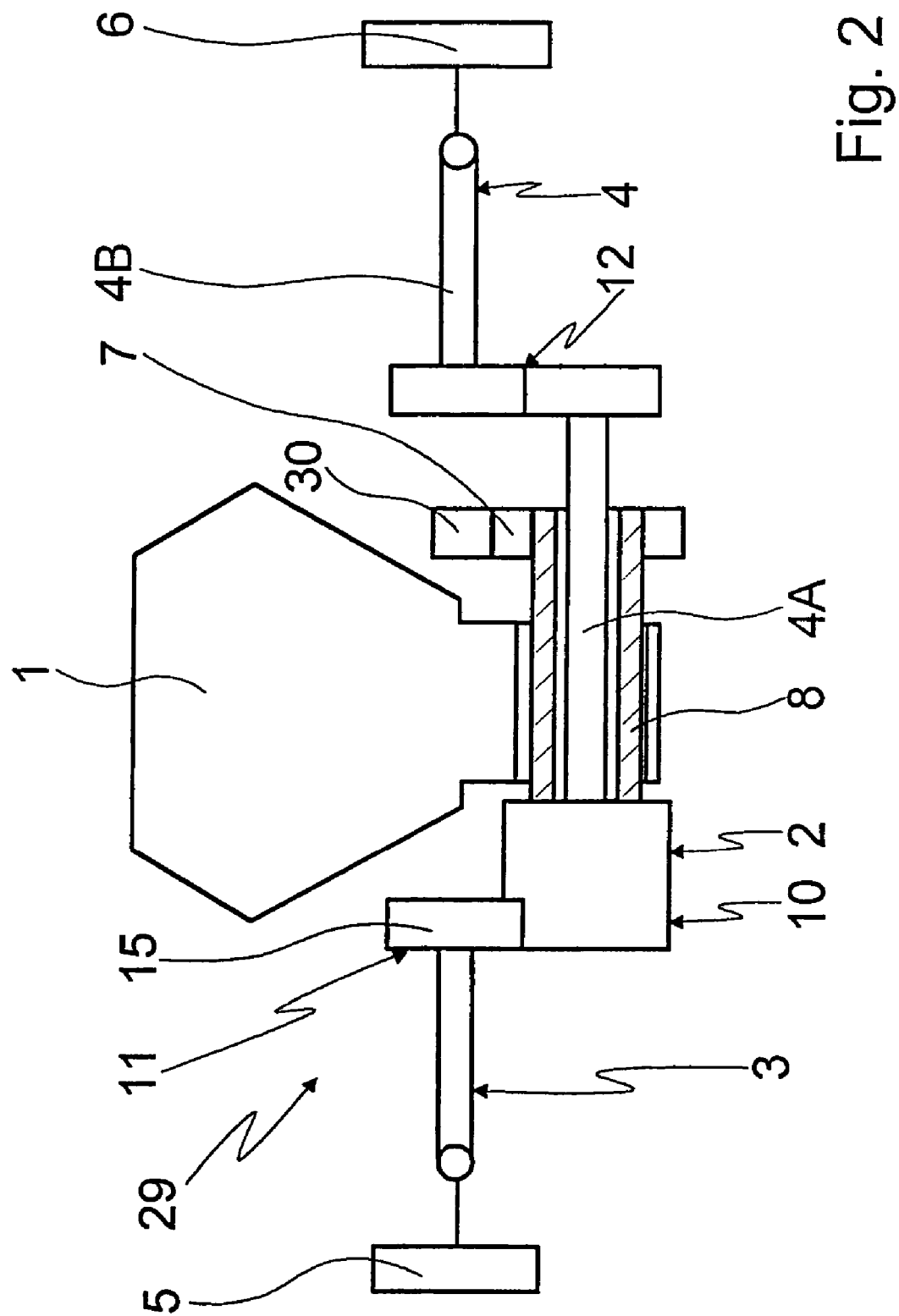
FIG. 2 is a presentation based on FIG. 1, whereby an axle displacement between the drive gears and the differential is respectively bridged over by means of a pairing of spur gears.

FIG. 2 principally shows the vehicle's front axle 29 and the motor 1, as depicted in FIG. 1, whereby an axle displacement between the output shafts 5, 6 and the differential 2 is compensated for by gear pairing 11 or 12. The gear pairing 12 is between the crown gear 7 and the drive wheel 6 and the similar gear pairing 11 is carried out in that area between the differential 2 and the drive wheel 5.

FIG. 3 shows a possible formation of the differential 2, as this is presented in the schematic drawing of FIG. 2, having an axle displacement compensation, wherein the hollow shaft 8, in the area of the shaft coupling assembly 10, is threadedly connected with the differential cage 9. The gear pairing 11 is carried out by a spur gear toothing 13, which is cut into an axle bevel gear 14 and a toothed gear, i.e., a spur gear 15, which meshes with the spur gear toothing 13.

With the invented embodiment, as shown in FIGS. 2 and 3, of a differential having the possibility of axle displacement compensation, it is possible that a particularly critical property of a vehicle has been brought to the lowest possible level. The reason for this is that the motor 1 can be dropped to a very low elevation, due to the vertically aligned output shaft 4 which, in its positional relation to the drive wheels 5, 6 contrasts with the known conventional method of the practice.

In a deeper location of the motor 1 in the vehicle and when the motor, as seen in forward travel direction, is placed conventionally in front of passenger seat area of the vehicle, then the two drive wheels 5, 6 of the front axle 29 need no longer be connected in a direct, straight line with one another nor need their connection cross over through the motor 1. Because of the penetrating axle displacement compensation with the invented differential 2, the possibility arises that the two drive wheels 5, 6 can be space-savingly bound onto the driving gear string of a vehicle axle installed proximal to the motor 1 without a penetrative passage through the motor.

In addition to the spur gear toothing 13, the bevel gear 14 as well as an additional bevel gear 16 are machined with a bevel gear toothing 17, so that both bevel gears can engage in the complementary toothing 19, 20 of the two pinion gears 21, 22.

The axial force which, during the operation of the differential 2 by the gear tooth pairing between the bevel gears 14 and 16 and the pinion gears 21, 22, acts upon the driving bevel gears 14, 16 is, contrary to the known bevel gear differential of the practice, not supported on the differential cage 9. On the other hand, this force is introduced into a bolt 23 which serves as a common axle for the two bevel gears 14,16. On the bolt 23, the two bevel gears 14,16 rotate whereby the two bevel gears 14, 16, by means of the two disklike constructed axial detents 24, 25, which are threadedly engaged with the bolt 23, the bevel gears 14, 16 are held in the axial direction of the bolt 23.

The introduction of the output torque of the transmission into the differential 2 is done by means of the hollow shaft 8 in the differential cage 9, wherein the torque apportions itself, through the differential bolts 26, 27 and the differential bolts 26, 27 onto the pinions 21 and 22. The now split forces resulting from the toothing with the bevel gears 14, 16 and which act upon the pinions 21, 22 find support by means of the differential cage 9, which is ring shaped. Further, the toothing forces, which act upon the crown gear 7 and which are introduced into the differential cage 9 by the hollow shaft 8, are brought into the bolt 23 by the differential bolts 26, 27, whereby these bolts serve as support for the differential pinions 21, 22.

The bolt 23 is presently encased in a shell-like component 28, upon which both bevel gears 14, 16 and the pinion gears 21, 22 are supported. Into the shell-like component 28, enter the differential bolts 26, 27, which engage, with their ends which are remote from the cage 9, both the differential cage 9 and the pinion gears 21, 22 for the reason that the toothing force of the crown gear 7, by the differential bolts 26, 27, is brought by the cross-shaped shell-like bolt 28 into the bolt 23.

The components of the differential 2 are located within a housing of the differential 2 (not shown). This placement can be provided in the area of the bevel gears 14, 16 or on an extension of the axial supports 24, 25 (not shown). Alternative thereto, the location can be made in the housing of the differential, especially above the differential cage.

REFERENCE NUMERALS 1 motor
2 differential gear
3 output drive shaft
4 output drive shaft
4A transverse shaft
4B jointed shaft
5 drive gear
6 drive gear
7 crown gear
8 internal gear
9 differential cage
10 semi-independent suspension
11 gear pairing
12 gear pairing
13 spur gear toothing
14 bevel gear
15 gear
16 bevel gear
17 bevel gear toothing
18 bevel gear toothing
19 bevel gear toothing
20 bevel gear toothing
21 differential pinion
23 bolt
24 axial detent support (bolt)
25 axial detent support (bolt)
26 differential bolt
27 differential bolt
28 shell-like component
29 vehicle front axle
30 bevel gear

The invention claimed is:

1. A differential (2) for a vehicle for the apportionment of a drive torque of a drive motor (1) between a first output shaft (4) supporting a first driven wheel (6) and a second output shaft (3) supporting a second driven wheel (5), the differential (2) comprising:

a crown gear receiving a drive torque via a drive shaft connected to the drive motor (1) and the crown gear (7) is positioned on a first side of the drive motor between the drive motor (1) and the first driven wheel (6);

a front shaft coupling assembly (10) is spaced from the crown gear (7) and positioned on a second opposite side of the drive motor (1) between the drive motor (1) and the second driven wheel (5) for compensation of rotational speed differences between the first and second output shafts (3, 4); and wherein the crown gear (7) is non-rotatably supported on a torque shaft (8) extending from the first side of the drive motor (1) transverse to the drive motor (1) to the second side of the drive motor (1) to connect with the front shaft coupling assembly (10).

2. The differential according to claim 1, wherein the torque shaft (8) which connects the crown gear (7) with the front shaft coupling assembly (10) is a hollow shaft.

3. The differential according to claim 2, wherein one of the first and second output shafts (3, 4) is partially housed with the hollow torque shaft (8).

4. The differential according to claim 1, wherein the front shaft coupling assembly (10) connects the two output shafts (3, 4) and is rotatably fastened to the motor (1).

5. The differential according to claim 1, wherein the crown gear (7) is supported on a steering mechanism connected with the motor (1).

6. The differential according to claim 1, wherein the torque shaft (8) supporting the crown gear (7) is connected with a differential cage (9) of the front shaft coupling assembly (10).

7. The differential according to claim 1, wherein the torque shaft (8), between the crown gear (7) and the front shaft coupling assembly (10) is conducted through a housing part of the motor (1).

8. The differential according to claim 1, wherein the torque shaft between the front shaft coupling assembly (10) and the crown gear runs underneath the motor (1).

9. The differential according to claim 1, wherein between the first and second driven wheels (5, 6) and the two output shafts (3, 4), respectively, a tooth gear pairing (11, 12), for bridging an axial displacement, is provided.

10. The differential according to claim 9, wherein the tooth gear pairing (11, 12) provided for compensation of axial displacement, are respectively formed from a spur gear toothing (13), which is actively bound with drive bevel gears (14, 16) and formed from a spur gear (15) which is connected to one of the first and second output shafts (3, 4).

11. The differential according to claim 10, wherein the drive bevel gear (14) and the spur gear toothing (13) are made as one piece.

12. The differential according to claim 10, wherein the drive bevel gears (14, 16) are placed upon one common axle (23).

13. The differential according to claim 10, wherein the drive torque of the motor (1) is supplied to the crown gear (7) and subsequently onto a connected differential cage (9), said cage is further connected to front shaft coupling assembly (10).

14. The differential according to claim 13, wherein the drive torque from the differential cage (9) is transferable to pinion gears (21, 22) by means of bolts (28, 27), the bolts engage themselves in the said differential cage (9) and are rotatably mounted on the pinion gears, which mesh with the bevel gears (14, 16).

15. The differential according to claim 14, wherein the differential cage (9) is a ring and abuts radial forces of a bevel gear toothing (19, 20) of the pinion gears (21, 22).

16. The differential according to claim 14, wherein in an area of toothing of the crown gear (7), occurring toothing forces are absorbed by the differential bolts (26, 27) on a common axle (23) of the bevel gears (14, 16).

17. A vehicle drive train having a prime mover, the drive train comprising:
 a front differential (2) for apportioning a drive torque from the prime mover (1) between a first half-shaft (4) and a second half-shaft of a vehicle drive train, the front differential (2) comprising;
 a crown gear positioned on a first side of the prime mover for receiving a drive torque;
 a front shaft coupling assembly (10) is positioned on an opposite second side of the prime mover from the first side for compensation of rotational speed differences between the first and second half-shafts (3, 4); and
 a torque shaft (8) supporting the crown gear on the first side of the motor extends from the first side of the prime mover (1) transverse to the prime mover (1) to the second side of the prime mover (1) to connect with the front shaft coupling assembly (10).

18. The vehicle drive train as set forth in claim 17 wherein the torque shaft 8 is axially aligned and concentrically positioned about at least one of the first end second half-shafts of the vehicle drive train.

19. The vehicle drive train as set forth in claim 18 wherein a first end of the torque shaft (8) supports the crown gear on the first side of the motor, and a second end of the torque shaft (8) is connected directly with a differential cage (9) supporting the to front shaft coupling assembly (10).

* * * * *